United States Patent [19]

Gergen et al.

[11] Patent Number: 4,818,786
[45] Date of Patent: Apr. 4, 1989

[54] POLYMER BLEND OF CARBON MONOXIDE/OLEFIN COPOLYMER AND A POLYVINYLIDINE FLUORIDE POLYMER

[75] Inventors: William P. Gergen, Houston, Tex.; Robert G. Lutz, Santa Rosa, Calif.

[73] Assignee: Shell Oil Company, Houston, Tex.

[21] Appl. No.: 203,973

[22] Filed: Jun. 8, 1988

[51] Int. Cl.$^4$ ............................................. C08F 8/00
[52] U.S. Cl. .................................... 525/55; 525/153; 525/539; 525/130; 525/189; 528/392
[58] Field of Search ............... 525/55, 153, 539, 130, 525/189; 528/392

[56] References Cited

U.S. PATENT DOCUMENTS

| | | | |
|---|---|---|---|
| 2,435,537 | 2/1948 | Ford et al. | 260/92.5 |
| 2,495,286 | 1/1950 | Brubaker | 260/63 |
| 3,031,437 | 4/1962 | Iserson | 260/87.7 |
| 3,676,192 | 7/1972 | Hahn | 117/93.31 |
| 3,694,412 | 9/1972 | Nozaki | 260/63 |
| 4,642,326 | 2/1987 | Yasumura et al. | 525/153 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 222454 | 11/1987 | European Pat. Off. |
| 1081304 | 8/1965 | United Kingdom |
| 1094558 | 11/1966 | United Kingdom |
| 1079108 | 8/1967 | United Kingdom |

*Primary Examiner*—Harold D. Anderson
*Assistant Examiner*—T. Mason

[57] ABSTRACT

Non-miscible blends of (a) a linear alternating polymer of carbon monoxide and at least one ethylenically unsaturated hydrocarbon with (b) a polyvinylidine fluoride polymer of predominantly vinylidine fluoride exhibit improved appearance, melt stability, and impact resistance.

8 Claims, No Drawings

POLYMER BLEND OF CARBON MONOXIDE/OLEFIN COPOLYMER AND A POLYVINYLIDINE FLUORIDE POLYMER

FIELD OF THE INVENTION

This invention relates to an improved polymer blend comprising predominantly a linear alternating polymer of carbon monoxide and at least one ethylenically unsaturated hydrocarbon. More particularly the invention relates to blends of the linear alternating polymer and polyvinylidene fluoride.

BACKGROUND OF THE INVENTION

The class of polymers of carbon monoxide and olefins has been known for some time. Brubaker, U.S. Pat. No. 2,495,286, produced such polymers of relatively low carbon monoxide content in the presence of free radical initiators, e.g., peroxy compounds. U.K. Pat. No. 1,081,304 produced similar polymers of higher carbon monoxide content in the presence of alkylphosphine complexes of palladium salts as catalyst. Nozaki extended the process to produce linear alternating polymers by the use of arylphosphine complexes of palladium moieties and certain inert solvents. See, for example, U.S. Pat. No. 3,964,412.

More recently, the class of linear alternating polymers of carbon monoxide and at least one ethylenically unsaturated hydrocarbon, e.g., polymers of carbon monoxide and ethylene or carbon monoxide, ethylene and propylene, has become of greater interest in part because of the greater availability of the polymers. These polymers, often referred to as polyketones or polyketone polymers, have been shown to be of the repeating formula —CO—(A)— where A is the moiety of unsaturated hydrocarbon polymerized through the ethylenic unsaturation. For example, when the polymer is ethylene the polymer is represented by the repeating formula —CO—(—CH$_2$—CH$_2$—)—. The general process for the more recent production is illustrated by a number of published European Patent Applications including Nos. 0,121,965 and 0,181,014. The process involves the use of a catalyst composition formed from a compound of palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for food and drink and internal and external parts for automotive applications, which articles are produced by processing the polyketone polymer by known methods. For some particular applications it has been found desirable to have properties which are somewhat different from those of the polyketone polymer. It would be an advantage to retain the more desirable properties of the polyketone polymer and yet improve other properties. Such advantages are often obtained by the provision of a polymer blend.

SUMMARY OF THE INVENTION

The present invention contemplates the provision of blends of linear alternating polymer of carbon monoxide and at least one ethylenically unsaturated hydrocarbon. More particularly, there are provided blends of the linear alternating polymer with a polyvinylidine fluoride polymer. Such blends exhibit improved melt stability and impact strength as compared with the unblended linear alternating polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as the precursors of the polyketone polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymers is that of a linear alternating polymer of carbon monoxide and ethylenically unsaturated hydrocarbon and there will be within the polymer substantially one moiety of carbon monoxide for moiety of hydrocarbon. When terpolymers are employed in the blends of the invention, there will be within the polymer chain at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain is therefore represented by the formula

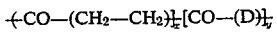

$$+\!\!-\!\text{CO}\!-\!(\text{CH}_2\!-\!\text{CH}_2)\!\xrightarrow{}_{x}\![\text{CO}\!-\!(\text{D})]_{y}$$

where D is the moiety of the second hydrocarbon of at least 3 carbon atoms polymerized through the ethylenic unsaturation. The —CO—(CH$_2$—CH$_2$)— units and the —CO—(D)— units are found randomly throughout the polymer chain and the ratio of y:x is not more than about 0.5. In the modification of the blends of the invention where copolymer of carbon monoxide and ethylene is employed, there will be no second hydrocarbon present and such polymers are represented by the above formula wherein y=0. When y is other than 0, i.e., terpolymers are employed, the ratio of y:x is preferably from about 0.01 to about 0.1. The end groups or "caps" of the polymer chain will depend on what materials are present during the production of the polymer and whether and how the polymer has been purified. The precise properties of the polymer will not depend on the end groups to any considerable extent so that the polymer is fairly represented by the above formula for the polymer chain. Of particular interest are the polyketones of a number average molecular weight from about 1,000 to about 200,000, especially those of molecular weight from about 20,000 to about 90,000 as determined by gel permeation chromatography (GPC). The physical properties of the polymers will depend in part on the molecular weight, whether the polymer is a copolymer or a terpolymer and the relative proportion of second hydrocarbon present in the case of terpolymers. Typical melting points are from about 175° C. to about 300° C., more typically from about 210° C. to about 270° C. The polymers have a limiting viscosity number (LVN) of from about 0.5 to about 10, preferably from about 0.8 to about 4, when measured m-cresol at 60° C. in a standard capillary viscosity measuring device.

A method of producing the polyketones which is now becoming conventional is to contact the carbon monoxide and hydrocarbon in the presence of a catalyst composition formed from a palladium compound, the anion of a non-hydrohalogenic acid having a pKa below about 6 and a bidentate ligand of phosphorus. The scope of the process for the production of polyketone polymers is extensive but, without wishing to be limited, a preferred palladium compound is a palladium carboxylate, especially palladium acetate, the preferred anion is the anion of trifluoroacetic acid or p-toluenesulfonic acid and the preferred bidentate phosphorus ligands are 1,3-bis(diphenylphosphino)propane, and 1,3-bis[di(2-methoxyphenyl)phosphino]propane.

Polymerization is conducted in a gas phase in the substantial absence of reaction diluent or in a liquid phase in the presence of a reaction diluent such as a lower alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer is recovered as by decantation or filtration. The polymer product may contain residues of the catalyst which are removed if desired by treatment with a solvent or extracting agent which is selective for the residues.

The minor component of the blends of the invention is a polyvinylidine fluoride polymer. By polyvinylidine fluoride polymer is meant a polymer wherein at least a considerable predominance of the monomer units present is vinylidine fluoride, i.e., $CH_2=CF_2$. In preferred modifications the polyvinylidine polymer is a homopolymer of vinylidine fluoride. In other modifications, however, copolymers of at least 90% by mole of vinylidine fluoride are suitable with any remainder being other fluorinated monomeric moieties containing fluorine such as tetrafluoroethylene, hexafluoropropylene or vinyl fluoride. Such polyvinylidine fluoride polymers are well known in the art and are produced, for example, by conventional methods such as are described in U.S. Pat. No. 2,435,537 and U.S. Pat. No. 3,031,437, and in British Pat. Nos. 1,079,108; 1,094,558 and 1,190,999. The polyvinylidine fluoride polymers are thermoplastic in character having softening temperatures on the order of 145° C. to 190° C. and are conventionally used in films and coatings. Such polymers are commercially available, e.g. Penwalt KYNAR ®460.

The blends of the invention comprise a mixture of a major proportion of the polyketone polymer and a minor proportion of the vinylidine fluoride polymer. The precise proportion of the polyvinylidine fluoride polymer is not critical and amounts of polyvinylidine fluoride polymer from about 0.5% by weight to about 45% by weight, based on total blend, are satisfactory. Amounts of polyvinylidine fluoride polymer from about 1% by weight to about 30% by weight on the same basis, are preferred.

The precise method of producing the blend of the polyketone polymer and the polyvinylidine polymer is not material so long as a uniform mixture of the components is obtained without undue degradation of the components or the resulting blend. The polyketone/polyvinylidine fluoride polymer blend is a non-miscible blend with the polyvinylidine fluoride polymer existing as a discrete phase in the polyketone matrix with a phase size on the order of from about 0.8 micron to about 2.2 microns, more often on the order of from about 1.2 micron to about 1.6 micron. The blends will not be homogeneous, of course, but satisfactory blends are obtained when the polyvinylidine fluoride polymer is uniformly distributed throughout the polyketone phase. The method of blending the polymeric components is that which is conventional for non-miscible polymeric materials. In one modification the polymeric components are blended in a corotating twin screw extruder. In an alternate modification the components are blended in a mixing device which exhibits high shear.

The blends of the invention may also include conventional additives such as antioxidants, stabilizers, fillers, fire resistant materials, mold release agents and other substances which are added to increase the processability of the polymers or modify the properties of the resulting blend. Such additives are added by conventional techniques prior to, together with or subsequent to the blending of the polyketone polymer and the polyvinylidine polymer.

The blends of the invention are characterized by improved melt stability and impact strength when compared to the properties of the polyketone polymer. The blends are processed by conventional methods such as extrusion and injection molding into sheets, films, fibers and shaped articles. Illustrative of useful applications for the blends of the invention are the production of internal as well as external parts for automotive applications and structural parts such as sheets and cables for use in the construction industry.

The invention is further illustrated by the following Illustrative Embodiments which should not be construed as limiting the invention.

Illustrative Embodiment I

A linear alternating polymer of carbon monoxide, ethylene and propylene (56/002) was produced in the presence of a catalyst composition formed from palladium acetate, the anion of trifluoroacetic acid and 1,3-bis(diphenylphosphino)propane. The melting point of the terpolymer was 221° C. and the polymer had a LVN of 1.48 when measured in m-cresol.

Illustrative Embodiment II

A blend of the polyketone polymer of Illustrative Embodiment I was made with 10% by volume of Penwalt KYNAR ®460 polyvinylidine fluoride. The polyketone polymer, the polyvinylidine polymer and approximately 0.2% by weight based on total polymer of Irganox 1076, a conventional hindered phenolic antioxidant to provide background stabilization, were processed through a 15 mm twin screw Baker Perkins extruder. The extruder temperature was 240° C. operating with undried feed and under a nitrogen blanket. The extruder was operated at 300 RPM to produce a residence time of 0.5 minutes and the extruded strands were passed directly into water. The resulting polymeric blend had improved melt stability and impact resistance, and was non-miscible as evidenced by examination of cut samples under an electron microscope. The polyvinylidine polymer was present as a discrete phase having a particle size of approximately 1.4 micron in diameter.

Illustrative Embodiment III

A linear alternating polymer of carbon monoxide, ethylene and propylene (087/032) was produced in the presence of a catalyst composition formed from palladium acetate, the anion of trifluoroacetic acid and 1,3-bis(diphenylphosphino)propane. The melting point of the terpolymer was 220° C. and the polymer had a LVN of 1.8 when measured in m-cresol.

Illustrative Embodiment IV

A blend of the polyketone polymer of Illustrative Embodiment III was made with 20% by volume of Penwalt KYNAR ®460 polyvinylidine fluoride. The polyketone polymer, the polyvinylidine polymer and approximately 0.2% by weight based on total polymer of Irganox 1076, a conventional hindered phenolic antioxidant to provide background stabilization, were processed through a 15 mm twin screw Baker Perkins extruder. The extruder temperature was 250° C. operating with undried feed and under a nitrogen blanket. The extruder was operated at 300 RPM to produce a residence time of 0.5 minutes and the extruded strands were passed directly into water. The resulting polymeric blend had significantly improved appearance and slightly improved impact strength than the base polyketone polymer. Center cut Notched Izod impact data for the blend and the base polymers are reported in Table I.

TABLE I

| KYNAR ® 460 (% by weight) | Notched Izod Rm Temp (ft lbs/in) |
|---|---|
| 0 | 3.9 |
| 20 | 4.5 |
| 100 | 1.9 |

What is claimed is:

1. A composition comprising a non-miscible blend of, as a major component, a linear alternating polymer of carbon monoxide and at least one ethylenically unsaturated hydrocarbon and, as a minor component, a polyvinylidine fluoride polymer.

2. The composition of claim 1 wherein the linear alternating polymer is represented by the formula

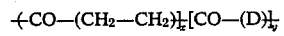

wherein D is the moiety of an ethylenically unsaturated hydrocarbon of at least 3 carbon atoms polymerized through the ethylenic unsaturation and the ratio of y:x is no more than about 0.5.

3. The composition of claim 2 wherein the polyvinylidine fluoride polymer has at least 90% of the monomeric units as vinylidine fluoride.

4. The composition of claim 3 wherein y=0.

5. The composition of claim 4 wherein the polyvinylidine fluoride polymer is homopolymeric vinylidine fluoride.

6. The composition of claim 3 wherein D is a moiety of propylene and the ratio of y:x is from about 0.01 to about 0.1.

7. The composition of claim 6 wherein any monomeric moieties of the polyvinylidine fluoride polymer other than vinylidine fluoride are selected from moieties of tetrafluoroethylene, hexafluoropropylene, or vinyl fluoride.

8. The composition of claim 7 wherein the polyvinylidine fluoride polymer is homopolymeric vinylidine fluoride.

* * * * *